United States Patent
Morris et al.

(10) Patent No.: US 9,429,176 B2
(45) Date of Patent: Aug. 30, 2016

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/319,607

(22) Filed: Jun. 30, 2014

(65) Prior Publication Data

US 2015/0375797 A1   Dec. 31, 2015

(51) Int. Cl.
  *B60R 13/04*   (2006.01)
  *F16B 2/22*   (2006.01)
  *B60R 13/02*   (2006.01)

(52) U.S. Cl.
  CPC ............. *F16B 2/22* (2013.01); *B60R 13/0206* (2013.01); *B60R 13/04* (2013.01)

(58) Field of Classification Search
  CPC .......... B60R 13/0206; B60R 13/0237; B60R 13/0243; B60J 5/0413; B60J 5/0416; B60J 5/0468; F16B 2/505; F16B 2/22
  USPC ............ 296/203.01, 190.04–190.07, 193.03, 296/146.7, 35.1, 35.3, 193.05
  See application file for complete search history.

(56) References Cited

U.S. PATENT DOCUMENTS

| | | | |
|---|---|---|---|
| 419,358 A | 1/1890 | Raymond et al. | |
| 1,219,398 A | 3/1917 | Huntsman | |
| 1,261,036 A | 8/1918 | Kerns | |
| 1,301,302 A | 4/1919 | Nolan | |
| 1,556,233 A | 10/1925 | Maise | |
| 1,819,126 A | 8/1931 | Scheibe | |
| 1,929,848 A | 10/1933 | Neely | |

(Continued)

FOREIGN PATENT DOCUMENTS

| BE | 842302 A | 9/1976 |
|---|---|---|
| CN | 1036250 A | 10/1989 |

(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Gregory Blankenship
(74) *Attorney, Agent, or Firm* — Cantor Colburn LLP

(57) ABSTRACT

In one aspect, an elastically averaged alignment system is provided. The system includes a first component having a first alignment member and a second alignment member extending outwardly away from each other, and a second component having an inner wall defining an alignment aperture, the inner wall having a first wall and an opposite second wall. The first and second alignment members are an elastically deformable material such that when the first and second alignment members are inserted into the alignment aperture, the first and second alignment members elastically deform to an elastically averaged final configuration to facilitate aligning the first component with the second component in a desired orientation.

18 Claims, 4 Drawing Sheets

(56) References Cited

U.S. PATENT DOCUMENTS

| | | |
|---|---|---|
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A * | 11/1974 | Kennicutt et al. ............ 403/224 |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyi |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A * | 8/1977 | Yamanaka .................. 296/35.1 |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A * | 3/1987 | Beal ............................. 296/156 |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A * | 12/1992 | Killworth et al. ............ 248/635 |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |

(56) References Cited

U.S. PATENT DOCUMENTS

| | | | |
|---|---|---|---|
| 5,698,276 A | 12/1997 | Mirabitur | |
| 5,702,779 A | 12/1997 | Siebelink, Jr. et al. | |
| 5,706,559 A | 1/1998 | Oliver | |
| 5,736,221 A | 4/1998 | Hardigg et al. | |
| 5,765,942 A | 6/1998 | Shirai et al. | |
| 5,775,860 A | 7/1998 | Meyer | |
| 5,795,118 A | 8/1998 | Osada et al. | |
| 5,797,170 A | 8/1998 | Akeno | |
| 5,797,714 A | 8/1998 | Oddenino | |
| 5,803,646 A | 9/1998 | Weihrauch | |
| 5,806,915 A | 9/1998 | Takabatake | |
| 5,810,535 A | 9/1998 | Fleckenstein et al. | |
| 5,820,292 A | 10/1998 | Fremstad | |
| 5,915,678 A | 6/1999 | Slocum et al. | |
| 5,920,200 A | 7/1999 | Pendse | |
| 5,929,382 A | 7/1999 | Moore | |
| 5,931,514 A | 8/1999 | Chung | |
| 5,934,729 A | 8/1999 | Baack | |
| 5,941,673 A | 8/1999 | Hayakawa et al. | |
| 5,988,678 A | 11/1999 | Nakamura | |
| 6,006,941 A | 12/1999 | Hitchings | |
| 6,010,306 A | 1/2000 | Bucher | |
| 6,062,763 A | 5/2000 | Sirois et al. | |
| 6,073,315 A | 6/2000 | Rasmussen | |
| 6,079,083 A | 6/2000 | Akashi | |
| 6,095,594 A | 8/2000 | Riddle et al. | |
| 6,103,987 A | 8/2000 | Nordquist | |
| 6,109,882 A | 8/2000 | Popov | |
| 6,152,436 A | 11/2000 | Sonderegger et al. | |
| 6,164,603 A | 12/2000 | Kawai | |
| 6,193,430 B1 | 2/2001 | Culpepper et al. | |
| 6,199,248 B1 | 3/2001 | Akashi | |
| 6,202,962 B1 | 3/2001 | Snyder | |
| 6,209,175 B1 | 4/2001 | Gershenson | |
| 6,209,178 B1 | 4/2001 | Wiese et al. | |
| 6,254,304 B1 | 7/2001 | Takizawa et al. | |
| 6,264,869 B1 | 7/2001 | Notarpietro et al. | |
| 6,283,540 B1 | 9/2001 | Siebelink, Jr. et al. | |
| 6,286,214 B1 | 9/2001 | Bean | |
| 6,289,560 B1 | 9/2001 | Guyot | |
| 6,299,478 B1 | 10/2001 | Jones et al. | |
| 6,311,960 B1 | 11/2001 | Pierman et al. | |
| 6,318,585 B1 | 11/2001 | Asagiri | |
| 6,321,495 B1 | 11/2001 | Oami | |
| 6,336,767 B1 | 1/2002 | Nordquist et al. | |
| 6,345,420 B1 | 2/2002 | Nabeshima | |
| 6,349,904 B1 | 2/2002 | Polad | |
| 6,351,380 B1 | 2/2002 | Curlee | |
| 6,354,574 B1 | 3/2002 | Oliver et al. | |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,470,540 B2 | 10/2002 | Aamodt et al. | |
| 6,478,102 B1 | 11/2002 | Puterbaugh | |
| 6,484,370 B2 | 11/2002 | Kanie et al. | |
| 6,485,241 B1 | 11/2002 | Oxford | |
| 6,498,297 B2 | 12/2002 | Samhammer | |
| 6,523,229 B2 | 2/2003 | Severson | |
| 6,523,817 B1 * | 2/2003 | Landry, Jr. | 267/141.4 |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 * | 8/2003 | Hinson | 277/598 |
| 6,637,095 B2 | 10/2003 | Stumpf et al. | |
| 6,658,698 B2 | 12/2003 | Chen | |
| 6,662,411 B2 | 12/2003 | Rubenstein | |
| 6,664,470 B2 * | 12/2003 | Nagamoto | 174/652 |
| 6,668,424 B1 | 12/2003 | Allen | |
| 6,677,065 B2 | 1/2004 | Blauer | |
| 6,692,016 B2 | 2/2004 | Yokota | |
| 6,712,329 B2 | 3/2004 | Ishigami et al. | |
| 6,746,172 B2 | 6/2004 | Culpepper | |
| 6,757,942 B2 | 7/2004 | Matsui | |
| 6,799,758 B2 | 10/2004 | Fries | |
| 6,821,091 B2 | 11/2004 | Lee | |
| 6,840,969 B2 | 1/2005 | Kobayashi et al. | |
| 6,857,676 B2 | 2/2005 | Kawaguchi et al. | |
| 6,857,809 B2 | 2/2005 | Granata | |
| 6,872,053 B2 | 3/2005 | Bucher | |
| 6,908,117 B1 | 6/2005 | Pickett, Jr. et al. | |
| 6,932,416 B2 | 8/2005 | Clauson | |
| 6,948,753 B2 | 9/2005 | Yoshida et al. | |
| 6,951,349 B2 | 10/2005 | Yokota | |
| 6,957,939 B2 | 10/2005 | Wilson | |
| 6,959,954 B2 | 11/2005 | Brandt et al. | |
| 6,966,601 B2 | 11/2005 | Matsumoto et al. | |
| 6,971,831 B2 | 12/2005 | Fattori et al. | |
| 6,997,487 B2 | 2/2006 | Kitzis | |
| 7,000,941 B2 | 2/2006 | Yokota | |
| 7,008,003 B1 | 3/2006 | Hirose et al. | |
| 7,014,094 B2 | 3/2006 | Alcoe | |
| 7,017,239 B2 | 3/2006 | Kurily et al. | |
| 7,036,779 B2 * | 5/2006 | Kawaguchi et al. | 248/220.31 |
| 7,055,785 B1 | 6/2006 | Diggle, III | |
| 7,055,849 B2 | 6/2006 | Yokota | |
| 7,059,628 B2 | 6/2006 | Yokota | |
| 7,073,260 B2 | 7/2006 | Jensen | |
| 7,089,998 B2 | 8/2006 | Crook | |
| 7,097,198 B2 | 8/2006 | Yokota | |
| 7,121,611 B2 * | 10/2006 | Hirotani et al. | 296/146.7 |
| 7,144,183 B2 | 12/2006 | Lian et al. | |
| 7,165,310 B2 | 1/2007 | Murakami et al. | |
| 7,172,210 B2 | 2/2007 | Yokota | |
| 7,178,855 B2 | 2/2007 | Catron et al. | |
| 7,198,315 B2 | 4/2007 | Cass et al. | |
| 7,207,758 B2 | 4/2007 | Leon et al. | |
| 7,234,852 B2 | 6/2007 | Nishizawa et al. | |
| 7,275,296 B2 | 10/2007 | DiCesare | |
| 7,306,418 B2 | 12/2007 | Kornblum | |
| 7,322,500 B2 | 1/2008 | Maierholzner | |
| 7,344,056 B2 | 3/2008 | Shelmon et al. | |
| 7,360,964 B2 | 4/2008 | Tsuya | |
| 7,369,408 B2 | 5/2008 | Chang | |
| 7,435,031 B2 | 10/2008 | Granata | |
| 7,454,105 B2 | 11/2008 | Yi | |
| 7,487,884 B2 | 2/2009 | Kim | |
| 7,493,716 B2 | 2/2009 | Brown | |
| 7,500,440 B2 | 3/2009 | Chiu | |
| 7,547,061 B2 | 6/2009 | Horimatsu | |
| 7,557,051 B2 | 7/2009 | Ryu et al. | |
| 7,568,316 B2 | 8/2009 | Choby et al. | |
| 7,591,573 B2 | 9/2009 | Maliar et al. | |
| D602,349 S | 10/2009 | Andersson | |
| 7,614,836 B2 | 11/2009 | Mohiuddin | |
| 7,672,126 B2 | 3/2010 | Yeh | |
| 7,677,650 B2 | 3/2010 | Huttenlocher | |
| 7,727,667 B2 | 6/2010 | Sakurai | |
| 7,764,853 B2 | 7/2010 | Yi et al. | |
| 7,793,998 B2 * | 9/2010 | Matsui et al. | 293/154 |
| 7,802,831 B2 | 9/2010 | Isayama et al. | |
| 7,803,015 B2 | 9/2010 | Pham | |
| 7,828,372 B2 | 11/2010 | Ellison | |
| 7,832,693 B2 | 11/2010 | Moerke et al. | |
| 7,862,272 B2 | 1/2011 | Nakajima | |
| 7,869,003 B2 | 1/2011 | Van Doren et al. | |
| 7,883,137 B2 | 2/2011 | Bar | |
| 7,891,926 B2 | 2/2011 | Jackson, Jr. | |
| 7,922,415 B2 | 4/2011 | Rudduck et al. | |
| 7,946,684 B2 | 5/2011 | Drury et al. | |
| 7,959,214 B2 | 6/2011 | Salhoff | |
| 8,029,222 B2 | 10/2011 | Nitsche | |
| 8,061,861 B2 | 11/2011 | Paxton et al. | |
| 8,101,264 B2 | 1/2012 | Pace et al. | |
| 8,136,819 B2 | 3/2012 | Yoshitsune et al. | |
| 8,162,375 B2 | 4/2012 | Gurtatowski et al. | |
| 8,203,496 B2 | 6/2012 | Miller et al. | |
| 8,203,843 B2 | 6/2012 | Chen | |
| 8,206,029 B2 | 6/2012 | Vaucher et al. | |
| 8,228,640 B2 | 7/2012 | Woodhead et al. | |
| 8,249,679 B2 | 8/2012 | Cui | |
| 8,261,581 B2 | 9/2012 | Cerruti et al. | |

(56) References Cited

U.S. PATENT DOCUMENTS

| | | |
|---|---|---|
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1* | 5/2003 | Wiens et al. ............ 446/120 |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1* | 9/2006 | Catron et al. ............ 296/146.7 |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1* | 2/2007 | Dauvergne ............ 296/146.7 |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239375 A1 | 10/2011 | Huang |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan et al. |
| 2012/0073094 A1 | 3/2012 | Bishop |

(56) References Cited

U.S. PATENT DOCUMENTS

| | | |
|---|---|---|
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1* | 1/2013 | Colombo et al. ............... 29/464 |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1* | 3/2015 | Morris et al. ............... 296/35.1 |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0115656 A1 | 4/2015 | Lungershausen |
| 2015/0135509 A1 | 5/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 200941716 Y | 8/2007 |
| CN | 200957794 Y | 10/2007 |
| CN | 101250964 A | 4/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101821534 A | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102756633 A | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 203189459 U | 9/2013 |
| CN | 203344856 U | 12/2013 |
| CN | 203991175 U | 12/2014 |
| DE | 1220673 B | 7/1966 |
| DE | 2527023 A1 | 12/1976 |
| DE | 2736012 A1 | 2/1978 |
| DE | 2809746 A1 | 9/1979 |
| DE | 3704190 A1 | 12/1987 |
| DE | 3711696 A1 | 10/1988 |
| DE | 3805693 A1 | 2/1989 |

(56) References Cited

FOREIGN PATENT DOCUMENTS

| | | |
|---|---|---|
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003153387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 A1 | 1/2004 |
| WO | 2007126201 A1 | 11/2007 |
| WO | 2008140659 A1 | 11/2008 |
| WO | 2010105354 A1 | 9/2010 |
| WO | 2011025606 A1 | 3/2011 |
| WO | 2013088447 A1 | 6/2013 |
| WO | 2013191622 A1 | 12/2013 |

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

"Elastic Averaging in Flexure Mechanisms: A Multi-Beam Paralleaogram Flexture Case-Study" by Shorya Awtar and Edip Sevincer, Proceeding of IDETC/CIE 2006, Paper DETC2006-99752, American Society of Mechnical Engineers (ASME), Sep. 2006.

"Passive Alignment of Micro-Fluidic Chips Using the Principle of Elastic Averaging" by Sitanshu Gurung, Thesis, Louisiana State University, Dept. of Mechnical Engineering, Dec. 2007.

"Precision Connector Assembly Using Elastic Averaging" by Patrick J. Willoughby and Alexander H. Slocum, Massachusetts Institute of technology (MIT), Cambridge, MA, American Society for Precision Engineering, 2004.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

Cross-sectional view of a prior art infrared welded assembly of BMW, Munich, Germany. Believed on the market since about Jan. 1, 2010.

Rojas, F.E., et al., "Kinematic Coupling for Precision Fixturing & Assembly" MIT Precision Engineering Research Group, Apr. 2013, 24 pages.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013, 4 pages.

Willoughby, Patrick, "Elastically Averaged Precision Alignment", Degree of Doctor of Philosophy in Mechanical Engineering Dissertation, Massachusetts Institute of Technology, 2005, 158 pages.

* cited by examiner

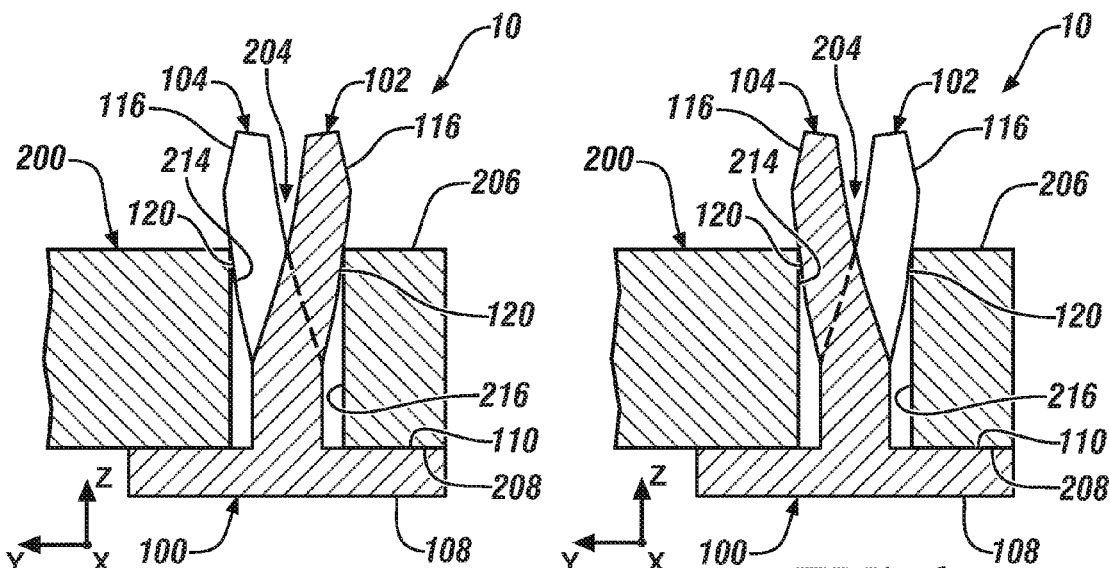
FIG. 5
FIG. 6
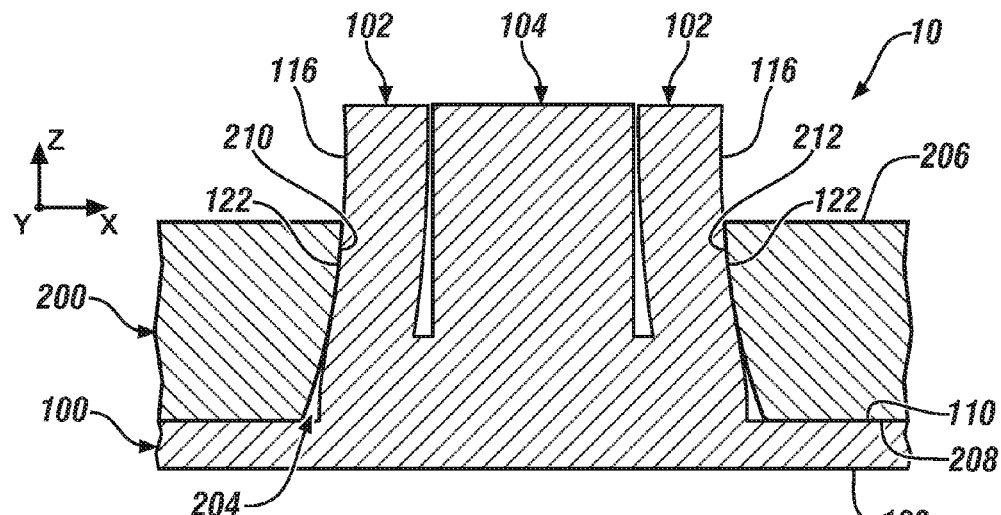
FIG. 7
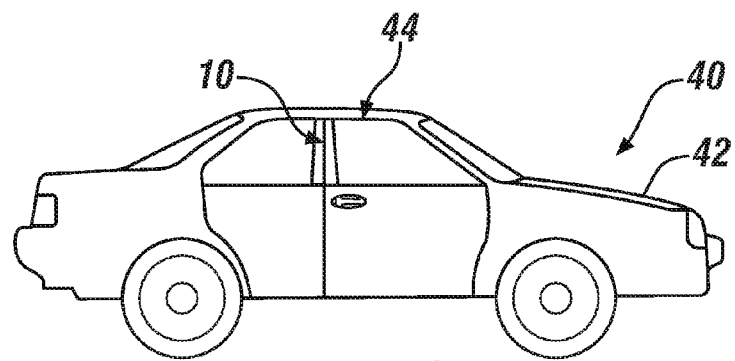
FIG. 8

ELASTICALLY AVERAGED ALIGNMENT SYSTEMS AND METHODS

FIELD OF THE INVENTION

The subject invention relates to matable components and, more specifically, to elastically averaged matable components for precise alignment therebetween.

BACKGROUND

Components, in particular vehicular components used in automotive vehicles, which are to be mated together in a manufacturing process may be mutually located with respect to each other by alignment features that are oversized holes and/or undersized upstanding bosses. Such alignment features are typically sized to provide spacing to freely move the components relative to one another to align them without creating an interference therebetween that would hinder the manufacturing process. One such example includes two-way and/or four-way male alignment features; typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variation in their alignment, particularly with regard to gaps and/or spacing therebetween. In the case where misaligned components are also part of another assembly, such misalignment may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking, and rattling.

SUMMARY OF THE INVENTION

In one aspect, an elastically averaged alignment system is provided. The system includes a first component having a first alignment member and a second alignment member extending outwardly away from each other, and a second component having an inner wall defining an alignment aperture, the inner wall having a first wall and an opposite second wall. The first and second alignment members are an elastically deformable material such that when the first and second alignment members are inserted into the alignment aperture, the first and second alignment members elastically deform to an elastically averaged final configuration to facilitate aligning the first component with the second component in a desired orientation.

In another aspect, a vehicle is provided. The vehicle includes a body and an elastically averaged alignment system integrally arranged within the body. The elastically averaged alignment system includes a first component having a first alignment member and a second alignment member extending outwardly away from each other, and a second component having an inner wall defining an alignment aperture, the inner wall having a first wall and an opposite second wall. The first and second alignment members are an elastically deformable material such that when the first and second alignment members are inserted into the alignment aperture, the first and second alignment members elastically deform to an elastically averaged final configuration to facilitate aligning the first component with the second component in a desired orientation.

In yet another aspect, a method of manufacturing an elastically averaged alignment system is provided. The system includes forming a first component having a first alignment member and a second alignment member extending outwardly away from each other, forming a second component having an inner wall defining an alignment aperture, the inner wall having a first wall and an opposite second wall, and forming the first and second alignment members from an elastically deformable material such that when the first and second alignment members are inserted into the alignment aperture, the first and second alignment members elastically deform to an elastically averaged final configuration to facilitate aligning the first component and the second component in a desired orientation.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 5 is a cross-sectional view of the system shown in FIG. 2 taken along line 5-5;

FIG. 6 is a cross-sectional view of the system shown in FIG. 2 taken along line 6-6;

FIG. 7 is a cross-sectional view of the system shown in FIG. 2 taken along line 7-7; and FIG. 8 is a side view of a vehicle that may use the elastically averaged alignment system shown in FIGS. 1 and 2.

DETAILED DESCRIPTION

Figure 1:
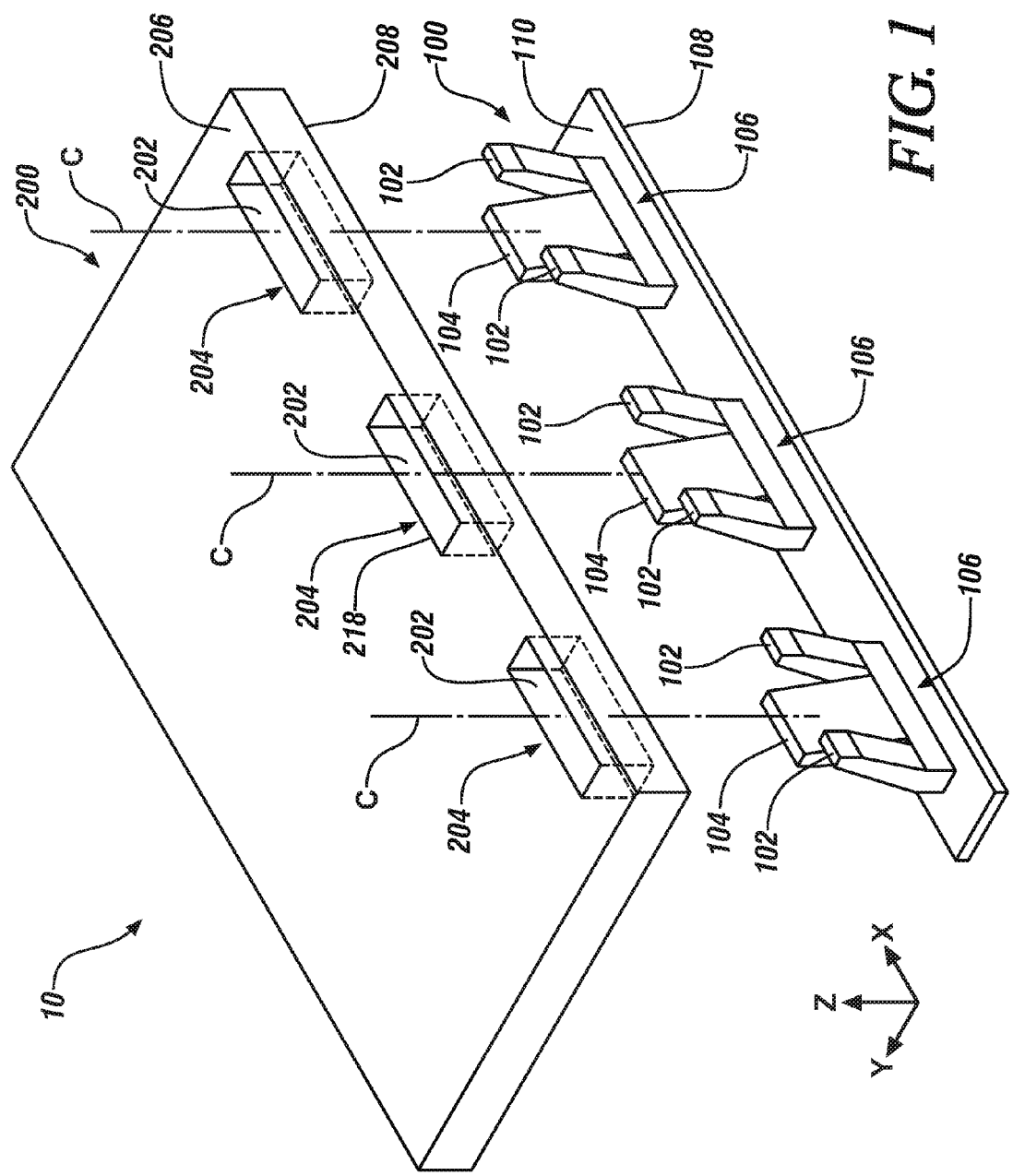
FIG. 1 is a perspective view of an exemplary elastic averaging alignment system before assembly.

The following description is merely exemplary in nature and is not intended to limit the present disclosure, its application or uses. For example, the embodiments shown are applicable to vehicle components, but the system disclosed herein may be used with any suitable components to provide securement and elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of an elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are elastic averaging alignment systems and methods. The alignment systems include a first component with a plurality of alignment members, and a second component having alignment apertures to receive the alignment members. The alignment members and/or the second component elastically deforms to facilitate precisely aligning the two components together in a desired orientation.

Figure 2:
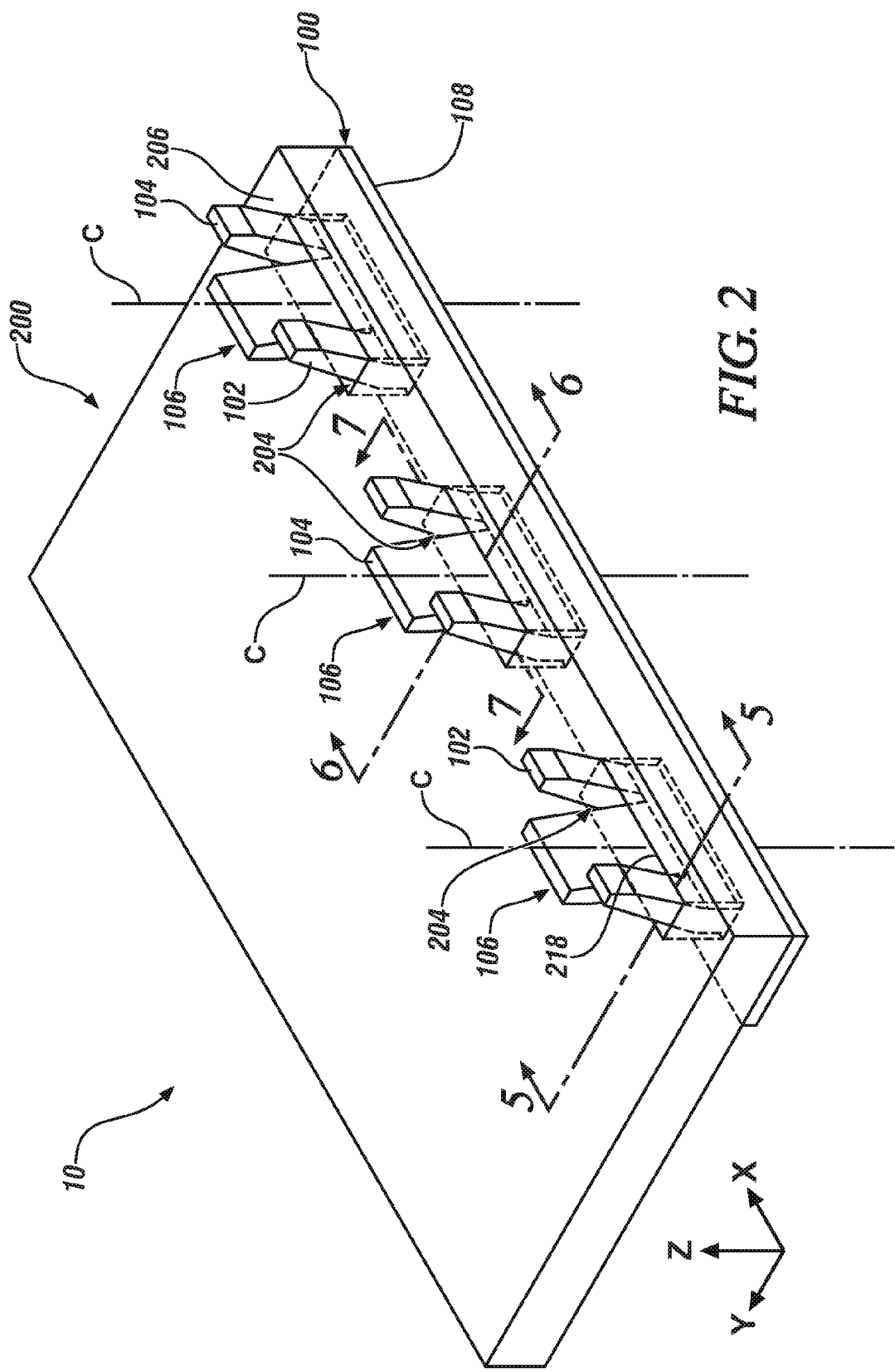
FIG. 2 is a perspective view of the system shown in FIG. 1 and after assembly.

FIGS. 1 and 2 illustrate an exemplary elastically averaged alignment system 10 that generally includes a first component 100 to be mated to a second component 200.

In the exemplary embodiment, first component 100 includes a plurality of alignment tabs or members 102 and 104, and second component 200 includes a plurality of inner walls 202 each defining an alignment aperture 204. Alignment members 102, 104 and alignment aperture 204 are fixedly disposed on or formed integrally with their respective component 100, 200 for proper alignment and orientation when components 100 and 200 are mated. First component 100 includes three alignment member groupings 106 that each include two alignment members 102 and one alignment member 104. However, component 100 may have any number of alignment member groupings 106, and each alignment member grouping 106 may include any number and combination of alignment members 102 and 104.

Elastically deformable alignment members 102, 104 are configured and disposed to interferingly, deformably, and matingly engage alignment aperture 204, as discussed herein in more detail, to precisely align first component 100 with second component 200 in four directions, such as the +/−x-direction and the +/−y-direction of an orthogonal coordinate system, for example, which is herein referred to as four-way alignment. Elastically deformable alignment members 102, 104 matingly engage alignment aperture 204 to facilitate a stiff and rigid connection between first component 100 and second component 200, thereby reducing or preventing relative movement therebetween.

Figure 3:
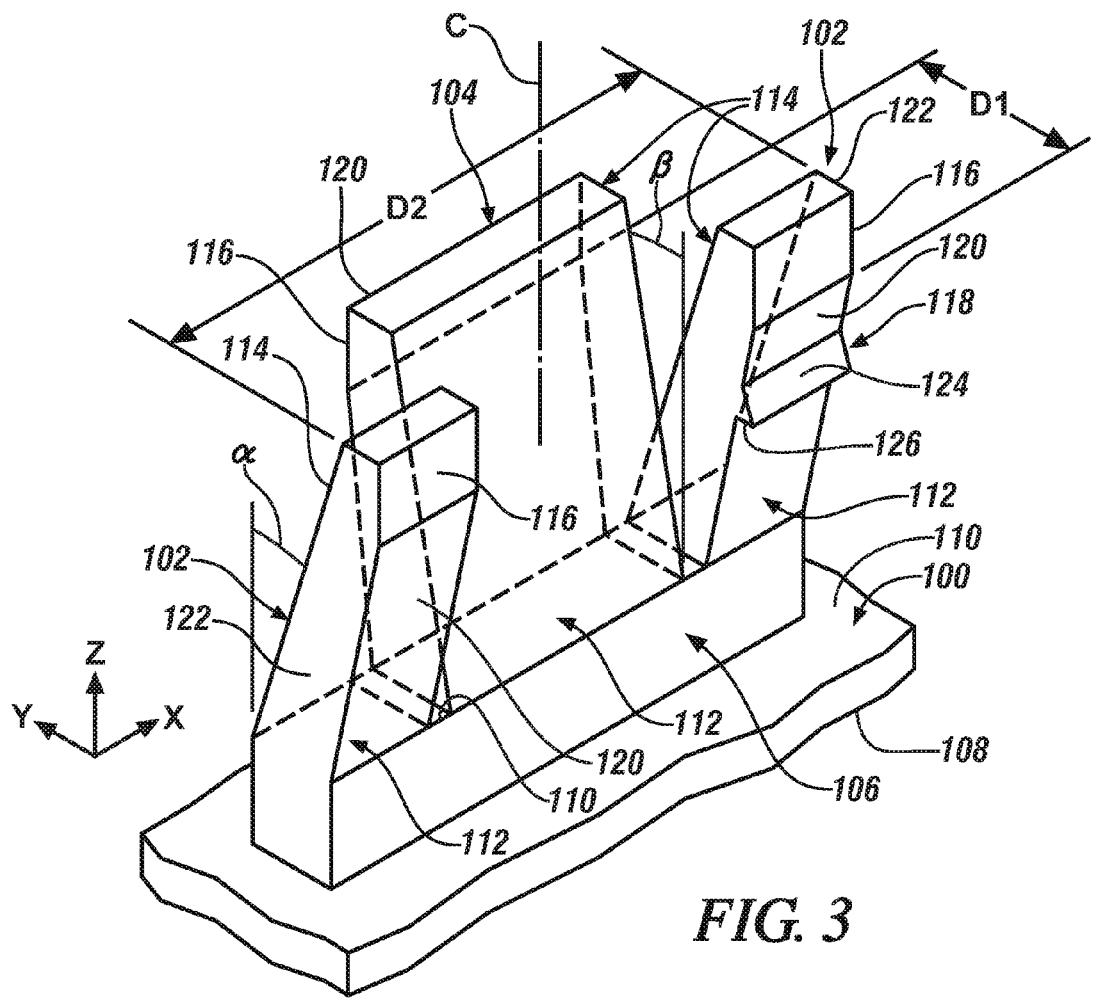
FIG. 3 is a perspective view of an alignment member of the system shown in FIG. 1.

With additional reference to FIG. 3, in the exemplary embodiment, first component 100 generally includes an outer face 108 and an inner face 110 from which alignment members 102 and 104 extend. Alignment members 102, 104 are each a generally rectangular, solid member having a proximal end 112 coupled to inner face 110, and a distal end 114. However, alignment members 102, 104 may have any cross-sectional shape that enables system 10 to function as described herein.

In the embodiment shown in FIG. 3, distal end 114 may include an angled lead-in surface 116 to facilitate inserting distal ends 114, and thus alignment member 102, 104, into alignment aperture 204. Alignment members 102, 104 may include a retention member 118 extending outwardly from an alignment member outer surface 120 and configured to engage second component 200. First component 100 may optionally include one or more stand-offs (not shown) for engaging and supporting second component 200 at a desired height above first component inner face 110. In the exemplary embodiment, first component 100 is fabricated from a rigid material such as plastic. However, first component 100 may be fabricated from any suitable material that enables system 10 to function as described herein.

Figure 4:
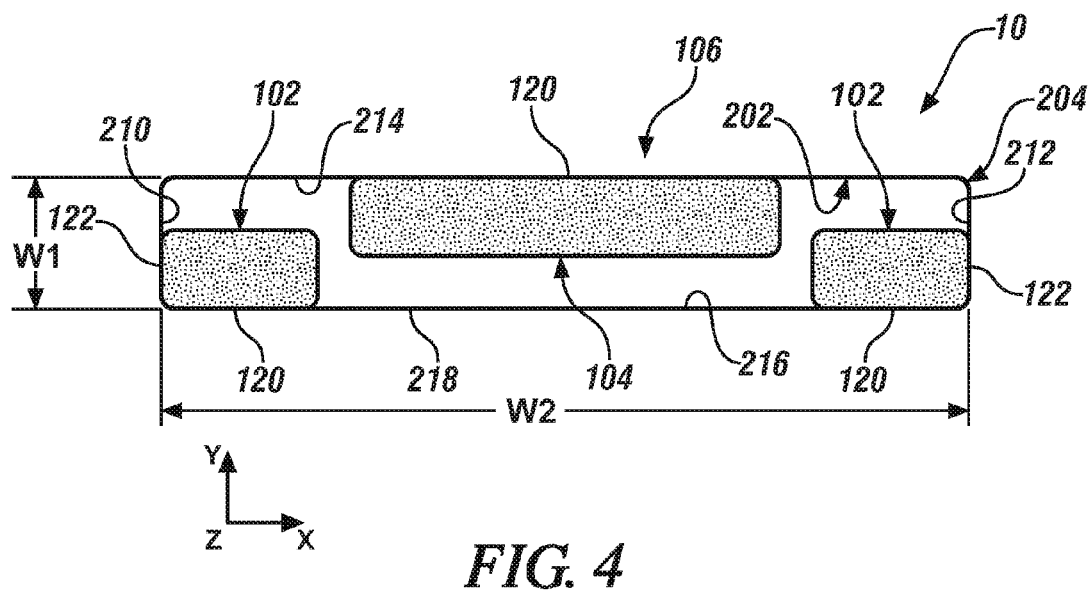
FIG. 4 is a plan view of the system shown in FIG. 2.

Second component 200 generally includes an outer face 206 and an inner face 208. Inner wall 202 includes opposed first and second walls 210 and 212, and opposed third and fourth walls 214 and 216 (FIG. 4). In the exemplary embodiment, alignment apertures 204 are illustrated as having a generally rectangular cross-section. Alternatively, alignment apertures 204 may have any shape that enables system 10 to function as described herein. In the exemplary embodiment, second component 200 is fabricated from a rigid material such as sheet metal. However, second component 200 may be fabricated from any suitable material that enables system 10 to function as described herein.

While not being limited to any particular structure, first component 100 may be a narrow trim bezel/strip that outlines a vehicle door, with the customer-visible side being outer face 108. Second component 200 may be a supporting substructure that is part of, or is attached to, the vehicle and on which first component 100 is fixedly mounted in precise alignment.

To provide an arrangement where elastically deformable alignment members 102, 104 are configured and disposed to interferingly, deformably and matingly engage alignment aperture 204, portions of alignment members 102, 104 are geometrically positioned in locations slightly beyond the size of a perimeter 218 of alignment aperture 204, which necessarily creates a purposeful interference fit between the elastically deformable alignment members 102, 104 and alignment aperture 204. For example, a distance 'D1' (FIG. 3) between the outer surfaces 120 of the distal ends 114 of alignment members 102 and 104 is greater than a width 'W1' (FIG. 4) of alignment aperture 204. Similarly, a distance 'D2' (FIG. 3) between the outer edges 122 of the outermost alignment members 102 of grouping 106 is greater than a width 'W2' (FIG. 4) of alignment aperture 204. As such, when inserted into alignment aperture 204, portions of the elastically deformable alignment members 102, 104 elastically deform to an elastically averaged final configuration that aligns first component 100 within the alignment aperture 204 in four planar orthogonal directions (the +/−x-direction and the +/−y-direction).

In an exemplary embodiment, alignment members 102, 104 are ramped or angled outwardly from a central axis 'C' (FIG. 3) of first component 100 to provide an interference with second component 200 that facilitates a predetermined force to insert first component 100 into alignment aperture 204. In the exemplary embodiment, alignment members 102 are angled outwardly in the opposite direction of alignment members 104. As best shown in FIG. 3, alignment members 102 are angled at an angle 'α' with respect to central axis 'C', and alignment members 104 are angled at an angle 'β'. As such, alignment members 102 and 104 diverge from each other as they extend from inner surface 110. Angles 'α' and 'β' may be varied to provide a desired force that will be required to insert each alignment member grouping 106 into an alignment aperture 204. For example, as angle 'α' and/or 'β' is increased, the force required for first component insertion is increased, and vice versa. Additionally, the stiffness of the coupling between first and second components 100, 200 may also be varied by varying angle 'α' and/or 'β'. In the exemplary embodiment, angles 'α' and 'β' are equal or substantially equal. However, angles 'α' and 'β' may each be any suitable angle less than 90° that enables system 10 to function as described herein.

FIGS. 2 and 4-7 illustrate an exemplary orientation of alignment members 102, 104 after assembly between first component 100 and second component 200. As shown in FIGS. 5 and 6, alignment members 102, 104 contact respective inner walls 216 and 214 and elastically deform toward each other to align first component 100 in a desired orientation relative to second component 200 in the +/−y-direction. As shown in FIG. 7, outer edges 122 of alignment members 102 contact respective inner walls 210 and 212 and elastically deform toward each other to align first component 100 in a desired orientation relative to second component 200 in the +/−x-direction. As shown in FIG. 4, in one embodiment, the width of member 104 is twice the width of member 102. As such, member 104 has twice the stiffness of each member 102.

In the exemplary embodiment shown in FIG. 3, alignment members 102 and/or 104 may include retention member 118 to facilitate retention of alignment member 102, 104 within alignment aperture 204. In the exemplary embodiment, retention member 118 includes an insertion surface 124 and a retention surface 126. Insertion surface 124 extends angularly from alignment member outer surface 120 and facilitates insertion of alignment member 102, 104 into alignment aperture 204. After insertion, retention surface 126 engages second component outer face 206 to facilitate preventing alignment member 102, 104 from backing out or otherwise being removed from alignment aperture 204. In the exemplary embodiment, retention member 118 has a triangular cross-section. Alternatively, retention member 118 may have any suitable shape that enables system 10 to function as described herein. For example retention member 118 may be a projection or rib (not shown). Accordingly, retention member 118 facilitates improved retention of alignment members 102, 104 within alignment apertures 204.

In view of the foregoing, and with reference now to FIG. 8, it will be appreciated that an embodiment of the invention also includes a vehicle 40 having a body 42 with an elastically averaging alignment system 10 as herein disclosed integrally arranged with the body 42. In the embodiment of FIG. 5, elastically averaging alignment system 10 is depicted forming at least a portion of a door assembly 44 of the vehicle 40. However, it is contemplated that an elastically averaging alignment system 10 as herein disclosed may be utilized with other structural features of the vehicle 40, such as interior trim, chrome strips, bezels, light strips, decorative trim, trim surround pieces, exterior trim, emblems, and lettering.

An exemplary method of manufacturing elastically averaged alignment system 10 includes forming first component 100 with a plurality of alignment member groupings 106 having alignment members 102, 104, and forming or providing second component 200 with inner walls 202 defining alignment apertures 204. Alignment members 102, 104 are formed from an elastically deformable material such that when alignment members 102, 104 are inserted into alignment aperture 204, alignment members 102, 104 elastically deform against inner wall 202 to an elastically averaged final configuration to facilitate aligning first component 100 with respect to second component 200 in a desired orientation. Alignment members 102 may be oriented at angle 'α', and alignment members 104 may be oriented at angle 'β', and each of alignment members 102 and 104 may be formed with lead-in surface 116 and/or retention member 118.

Systems and methods for elastically averaging mating and alignment systems are described herein. The systems generally include a thin, narrow first component having groupings of oppositely angled elastically deformable alignment members positioned for insertion into an alignment aperture of a second component. The mating of the first and second components is elastically averaged over the alignment members and respective alignment apertures to precisely mate the components in a desired orientation. Accordingly, the described systems and method facilitate precise alignment of small, thin components in tight spaces that do not allow packaging space for larger coupling features, and provide increased stiffness between coupled components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system comprising:
   a first component comprising a plurality of alignment member groupings, each of the plurality of alignment member groupings including two first alignment members and a second alignment member extending outwardly away from each other; and
   a second component comprising a plurality of alignment apertures, each of the plurality of apertures including an inner wall having a first wall and an opposite second wall,
   wherein the first and second alignment members are an elastically deformable material such that when the first and second alignment members are inserted into one of the plurality of alignment apertures, the first and second alignment members elastically deform to be received by one of the plurality of alignment apertures and thereafter expand outwardly to retain the first component relative to the second component thereby establishing an elastically averaged final configuration to facilitate aligning the first component with the second component in a desired orientation.

2. The system of claim 1, wherein the first component further comprises a central axis, and wherein the first alignment member is oriented at a first angle with respect to the central axis, the first alignment member elastically deforming against the first wall and the second alignment member elastically deforming against the second wall.

3. The system of claim 1, wherein the inner wall further includes a third wall and an opposite fourth wall, wherein the first alignment member elastically deforms against the third wall and the second alignment member elastically deforms against the fourth wall.

4. The system of claim 2, wherein the second alignment member is oriented at a second angle with respect to the central axis.

5. The system of claim 1, wherein at least one of the first and second alignment members comprises an angled lead-in surface configured to facilitate insertion of that alignment member into the alignment aperture.

6. The system of claim 1, wherein at least one of the first and second alignment members comprises a retention member extending therefrom.

7. The system of claim 6, wherein the retention member includes an angularly extending insertion surface and a retention surface configured to engage a portion of the second component to facilitate insertion and subsequently prevent removal of its associated alignment member from the alignment aperture.

8. The system of claim 1, wherein the second alignment member is positioned between the two first alignment members.

9. The system of claim 1, wherein the plurality of alignment member groupings are geometrically distributed with respect to the plurality of alignment apertures, such that portions of the elastically deformable first and second alignment members of each of the plurality of alignment member groupings, when engaged with respective ones of the plurality of alignment apertures, elastically deform to an elastically averaged final configuration that further aligns the first component with the second component in four planar orthogonal directions.

10. A vehicle comprising:
    a body; and
    an elastically averaged alignment system integrally arranged within the body, the elastically averaged alignment system comprising:
       a first component comprising a plurality of alignment member groupings, each of the plurality of alignment member groupings including two first alignment members and a second alignment member extending outwardly away from each other; and
       a second component comprising a plurality of alignment apertures, each of the plurality of apertures including an inner wall having a first wall and an opposite second wall,
       wherein the first and second alignment members are an elastically deformable material such that when the first and second alignment members are inserted into one of the plurality of alignment members, the first and second alignment members elastically deform to be received by one of the plurality of alignment apertures and thereafter expand outwardly to retain the first component relative to the second component thereby establishing an elastically averaged final configuration to facilitate aligning the first component with the second component in a desired orientation.

11. The vehicle of claim 10, wherein the first component further comprises a central axis, and wherein the first alignment member is oriented at a first angle with respect to the central axis, the first alignment member elastically deforming against the first wall and the second alignment member elastically deforming against the second wall.

12. The vehicle of claim 11, wherein the second alignment member is oriented at a second angle with respect to the central axis.

13. The vehicle of claim 10, wherein at least one of the first and second alignment members comprises an angled lead-in surface configured to facilitate insertion of that alignment member into the alignment aperture.

14. The vehicle of claim 10, wherein at least one of the first and second alignment members comprises a retention member extending therefrom, and wherein the retention member includes an angularly extending insertion surface and a retention surface configured to engage a portion of the second component to facilitate insertion and subsequently prevent removal of its associated alignment member from the alignment aperture.

15. The vehicle of claim 10, wherein the second alignment member is positioned between the two first alignment members.

16. The vehicle of claim 10, wherein the plurality of alignment member groupings are geometrically distributed with respect to the plurality of alignment apertures, such that portions of the elastically deformable first and second alignment members of each of the plurality of alignment member groupings, when engaged with respective ones of the plurality of alignment apertures, elastically deform to an elastically averaged final configuration that further aligns the first component with the second component in four planar orthogonal directions.

17. The vehicle of claim 10, wherein the first component is a strip of trim and the second component is a vehicle door.

18. A method of manufacturing an elastically averaged alignment system, the method comprising:
forming a first component having a plurality of alignment member groupings each including a first alignment member and a second alignment member extending outwardly away from each other;
forming a second component having a plurality of alignment member apertures each including an inner wall having a first wall and an opposite second wall; and
forming the first and second alignment members from an elastically deformable material such that when the first and second alignment members are inserted into one of the plurality of alignment apertures, the first and second alignment members elastically deform to be received by one of the plurality of alignment apertures and thereafter expand outwardly to retain the first component relative to the second component thereby establishing an elastically averaged final configuration to facilitate aligning the first component and the second component in a desired orientation.

* * * * *